United States Patent [19]

Auger et al.

[11] Patent Number: 5,456,761

[45] Date of Patent: Oct. 10, 1995

[54] HIGH TEMPERATURE AND ABRASION RESISTANT TEMPERATURE MEASURING DEVICE

[75] Inventors: Marc Auger, Jonquiere; Daniel Baril, Pierrefonds; Luc Parent; Jean Perron, both of Chicoutimi, all of Canada

[73] Assignee: Alcan International Limited, Montreal, Canada

[21] Appl. No.: 92,393

[22] Filed: Jul. 15, 1993

[51] Int. Cl.$^6$ .................................................. H01L 35/02
[52] U.S. Cl. .................... 136/232; 136/233; 136/234; 374/139; 374/179; 374/208
[58] Field of Search ...................... 136/200, 230, 136/231, 232, 233, 234, 242; 374/179, 208, 209, 139, 140; 432/124

[56] References Cited

U.S. PATENT DOCUMENTS

| | | | |
|---|---|---|---|
| 3,322,416 | 5/1967 | Ostberg | 263/33 |
| 3,396,581 | 8/1968 | Iten et al. | 73/351 |
| 3,647,558 | 3/1972 | McMurtry | 136/234 |
| 3,966,560 | 6/1976 | Farago et al. | 201/32 |
| 4,118,986 | 10/1978 | Werner et al. | 73/351 |
| 4,558,959 | 12/1985 | Thomas et al. | 374/141 |
| 4,626,643 | 12/1986 | Minet | 219/10.55 B |
| 4,721,533 | 1/1988 | Phillippi et al. | 136/234 |
| 4,721,534 | 1/1988 | Phillippi et al. | 136/234 |
| 4,830,515 | 5/1989 | Cortes | 374/208 |
| 4,977,001 | 12/1990 | Greenspan | 428/34.6 |
| 4,984,904 | 1/1991 | Nakano et al. | 374/139 |
| 5,075,536 | 12/1991 | Towe et al. | 219/270 |
| 5,147,137 | 9/1992 | Thiesen | 374/139 |
| 5,173,283 | 12/1992 | Parent | 423/345 |
| 5,258,170 | 11/1993 | Parent | 423/345 |

FOREIGN PATENT DOCUMENTS

| | | |
|---|---|---|
| 1052313 | 4/1979 | Canada . |
| WO9202794 | 2/1992 | European Pat. Off. . |
| 2321768 | 11/1974 | Germany . |
| 57-119228 | 7/1982 | Japan . |
| 61-19598 | 5/1986 | Japan . |
| 56096779 | 5/1986 | Japan . |

OTHER PUBLICATIONS

Semkina et al—"A Refractory Protective Tube For Thermocouples In Copper Smelting"—Tsvetnye Metally, 1981, 4, 88–89.

*Primary Examiner*—Donald P. Walsh
*Assistant Examiner*—Chrisman D. Carroll
*Attorney, Agent, or Firm*—Cooper & Dunham

[57] ABSTRACT

A temperature measuring device for measuring the temperature of an abrasive particulate material of the type found, for example, in rotary calcining kilns and the like. The device comprises a temperature sensor producing an indication of a temperature to which the sensor is exposed, circuitry or the like for connecting the temperature sensor to remote equipment for converting the indication to a recognisable form and a protective element shielding the temperature sensor from damage by the abrasive particulate material. The protective element comprises a layer of ceramic material having a matrix of alumina reinforced with 5 to 50% by volume (based on the total volume of the ceramic material) of particles of silicon carbide having an average size, at least in two dimensions, within the range of about 5 to 60 microns. The protective element provides good abrasion, heat-shock and mechanical resistance while exhibiting sufficient thermal conductivity to avoid undue inaccuracies in the temperature measurements.

25 Claims, 3 Drawing Sheets

HIGH TEMPERATURE AND ABRASION RESISTANT TEMPERATURE MEASURING DEVICE

BACKGROUND OF THE INVENTION

I. Field of the Invention

This invention relates to temperature measuring devices, especially thermocouples, used for directly measuring the temperatures of hot moving highly abrasive particulate materials. More particularly, the invention relates to such devices which can be used effectively in harsh conditions in industrial equipment such as rotary calcining kilns or other furnaces.

II. Discussion of the Prior Art

Rotary calcining kilns are used in industry to heat and calcine various materials, such as petroleum coke and alumina, and it is usually beneficial to control the temperature profile within such kilns quite carefully to ensure that a valuable product is consistently produced. The most direct way of controlling the temperature profile would be to measure the temperature of the material being calcined at various positions spaced along the interior of the kiln and then to modify one or more of the factors which affect the temperature profile, such as the rate of rotation of the kiln, the rate of raw material feed, the heat input, the oxygen input, the angle of inclination of the kiln, and the like. However, this has proven to be difficult or impossible in practice because the conditions prevailing within such kilns are extremely hostile to direct temperature measuring devices, such as thermocouples, and such devices are so rapidly damaged or destroyed and that their use has been largely impractical.

Instead, resort has been made to indirect (non-contact) temperature measurement apparatus, e.g. optical pyrometers and even television cameras to observe such temperature-related characteristics as the positions of fireballs within the kiln or the physical appearance of the material being treated at various points. However, this has not proven to be entirely satisfactory. For instance, Canadian patent no. 1,052,313 issued to Merlyn M. Williams on Apr. 10, 1979 and assigned to Alcan Research And Development Limited, describes the difficulty of using optical pyrometers to measure temperatures within rotary calcining kilns, particularly in the presence of smoky discharges of kiln gases that can lead to false readings. The solution to this problem, according to this patent, is to provide an additional optical pyrometer spaced from the discharge end of the furnace and to operate an air supply when the output from the additional pyrometer becomes unstable in order to prevent smoky discharge from affecting the output of the additional optical pyrometer. This solution, while effective for overcoming the problem to be solved, merely illustrates the need for a more direct and reliable way of measuring temperatures within such kilns and furnaces by means of temperature sensors that can directly contact and measure the temperature of the charge within the kiln or furnace.

Attempts have been made to provide temperature measuring devices with protective coatings or casing that can resist the harsh conditions. However, such coatings and casings, while being able to resist very high temperatures and contact with moving abrasive particles, must not unduly reduce the sensitivity and accuracy of the temperature measuring devices and it has been difficult to find a material that combines suitable properties such as toughness, heat shock resistance, physical shock resistance and wear resistance with appropriate thermal conductivity and low thermal mass.

SUMMARY OF THE INVENTION

An object of the invention is to enable direct measurement of temperatures of moving bodies of abrasive particulate materials at high temperatures.

Another object of the invention is to provide a material that is sufficiently resistant to heat and abrasion that it can be used effectively as a protective element for temperature sensing apparatus intended for direct contact with moving bodies of particulate abrasive materials at high temperatures.

Yet another object of the invention is the provision of a heat measuring device capable of being used effectively for measuring the temperature of moving bodies of particulate abrasive materials at high temperatures.

According to one aspect of the invention, there is a temperature measuring device for measuring the temperature of an abrasive particulate material, such as that found in coke calciners and other furnaces. The device comprises a temperature sensor producing an indication of a temperature to which the sensor is exposed, means for connecting the temperature sensor to remote equipment for converting the indication to a recognisable form, and a protective element shielding the temperature sensor from damage by the abrasive particulate material. The protective element comprises a layer of ceramic material having a matrix of alumina reinforced with 5 to 50% by volume (based on volume of ceramic material) of particles of silicon carbide having an average size, at least in two dimensions, within the range of about 5 to 60 microns.

Other aspects of the invention relate to furnaces equipped with temperature measuring devices of the type indicated above and to protective elements for use in such devices.

The invention makes it possible to use direct temperature measurement in furnaces and the like containing moving bodies of abrasive particulate material at high temperatures in a commercially practical manner.

DETAILED DESCRIPTION OF THE PREFERRED EMBODIMENTS

Figure 1:
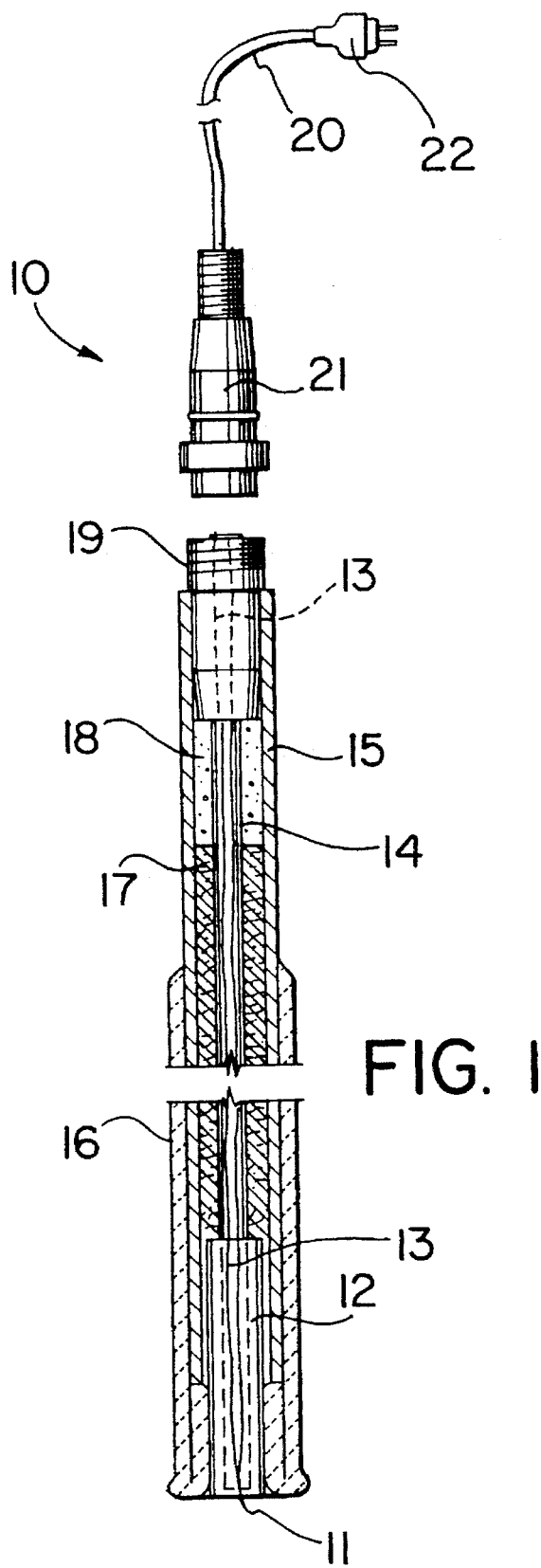
FIG. 1 is a longitudinal cross-section of a thermocouple unit which is an example of a temperature measuring device according to the present invention.

As shown in FIG. 1, at its lower end, a thermocouple unit 10 is provided with a thermocouple junction 11 acting as a temperature sensor which produces an indication of the temperature to which it is exposed. The junction 11 is preferably one which is resistant to high temperatures, for example a known platinum- or tungsten-based thermocouple junction and most preferably an S-type platinum-platinum rhodium junction.

The thermocouple junction 11 is enclosed within a protective element 12 in the form of a sheath of ceramic material comprising a matrix of alumina reinforced with particles of silicon carbide. This material has proven to be sufficiently hard and shock resistant to protect the junction 11 from rapid abrasion and damage when the unit is used to measure the temperature of a hot abrasive particulate material, e.g. of the type found within the interiors of rotary calcining kilns and other furnaces. However, the ceramic material is at the same time sufficiently heat conductive to avoid undue heat insulation of the thermocouple junction 11, which would reduce the response time of the thermocouple junction to temperature changes, and can be made thin enough to avoid high thermal mass that would also reduce the accuracy and response time of the device.

The ceramic material is one made from a mixture of alumina powder and about 5 to 50% by volume, ideally 10 to 30% by volume, of SiC particles. The alumina particles are preferably sub-micronic in size, while the particles of SiC are preferably 5 microns to 60 microns in average diameter. It is believed that the SiC particles reinforce the alumina matrix against thermal and mechanical shocks and provide the material with good thermal conductivity.

The alumina/SiC ceramic may be formed by cold pressing an homogenous mixture of the alumina and SiC particles to form an abrasion-resistant body. However, the ceramic is more preferably formed by the known technique of uniaxial hot-pressing an homogenous mixture of the particles, preferably in a graphite die, at a temperature in the range of 1450°–1700° C., preferably about 1500° C., under a pressure of 4000–8000 p.s.i., preferably about 6000 p.s.i., for a period of 0.5 to 2 hours, preferably about 1 hour, under an atmosphere of argon or other unreactive gas. This procedure is capable of producing a nearly pore-free block of ceramic material. While the actual hardness of the material produced in this way has not been measured, tests carried out on thermocouple devices incorporating protective elements made of this material have shown very little abrasion after six months of use in a rotary calcining kiln, indicating that the durability of such devices could be expected to be up to or more than one year, depending on the actual conditions to which the ceramic is exposed.

When the process by which the ceramic material is formed involves uniaxial hot-pressing, it is found that it is especially advantageous to use silicon carbide in the form of platelets rather than generally spherical particles. Platelets, which are usually single crystals of SiC, have large length and width dimensions compared to the thickness dimension, and uniaxial pressing tends to align all of the platelets in the same direction, thus improving the heat conductivity and reinforcing effect. This greatly improves the mechanical and thermal properties of the resulting composite material and can result in ceramics capable of withstanding temperatures as high as 1600° C. in both oxidizing and reducing atmospheres. Ideally, the platelets have lengths and widths in the range of 5–60 μm and thicknesses in the range of 1–10 μm. Thus their average size in two dimensions is within the 5–60 μm range, but may be outside this range in the third dimension.

SiC platelets can be obtained, for example, from Third Millenium Technologies, Inc., of Knoxville, Tenn. or can be produced according to the process of commonly-assigned U.S. patent application Ser. No. 731,116 filed Jul. 15, 1991, U.S. Pat. No. 5,258,170, the disclosure of which is incorporated herein by reference. Suitable alumina particles are readily commercially available.

The protective element 12 may be formed directly around the thermocouple junction 11, i.e. the thermocouple junction may be embedded within the ceramic particles before they are subjected to cold or hot pressing. Accordingly, as shown in FIG. 1, the ceramic material may be formed separately as a block provided with an axial blind bore open at one end for the insertion of the thermocouple junction and adjacent parts of the connecting wires. However, the alumina/SiC material is so hard that it is impractical to form a blind bore by drilling once a solid block of the ceramic has been produced, but the bore can be created by forming the ceramic powder mixture around a carbon rod, subjecting the powder to cold or hot pressing, and then drilling out the carbon rod or burning it away at high temperature in oxidizing conditions, e.g. by heating the block in air at a temperature of at least 700° C. and no more than 900° C. for 24 hours. After such treatment, there is no trace of the carbon rod remaining in the block.

Figure 3:
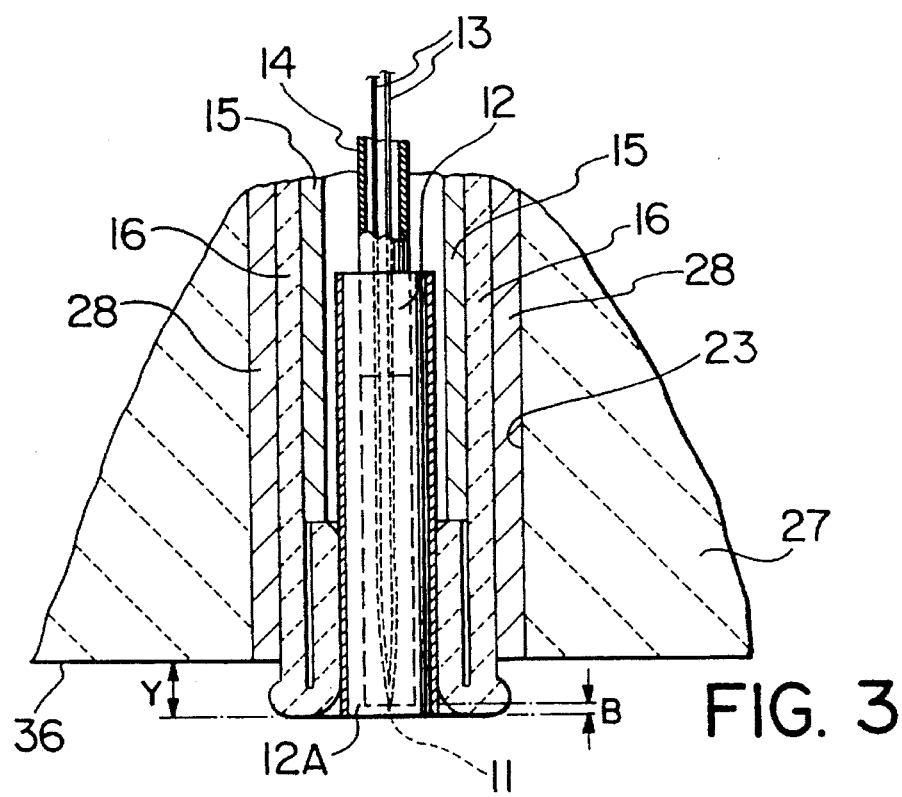
FIG. 3 is an enlarged cross-section of the temperature-sensing end of the thermocouple unit and an adjacent furnace wall shown in the dotted circle III of FIG. 2.

When the device is assembled, the thermocouple junction 11 should preferably be spaced from the outer surface of the protective element 12 exposed in use to the high temperature and abrasive conditions by a thickness of ceramic material in the range of 2 to 10 mm, and more preferably 2 to 3 mm. This thickness is shown in FIG. 3 as distance "B". Such thickness are adequate for providing good shock and abrasion resistance, without unduly affecting the thermal sensitivity of the thermocouple junction 11.

Within the body of the thermocouple device, connecting wires 13 for the thermocouple junction 11 extend away from the protective element 12 through a heat-insulating tube 14, preferably made of alumina, surrounded by an aluminum tube 15 having a protective outer jacket 16, made for example of ceramic fiber, at its lower region. The aluminum tube 15, which forms a housing for the thermocouple junction and connecting circuitry, and the protective jacket 16 are open at their lower ends as shown to allow direct contact between the tip of the protective element 12 and the contents of the rotary kiln. Above the protective element 11, the aluminum tube 15 is packed with ceramic wool 17 to provide heat insulation for the upper regions of the device, and then, approaching the upper end of the tube 15, with a cement 18 for sturdiness. The extreme upper end of the tube 15 is fitted with an electrical connector 19, preferably of the rapid release type, for attachment to a connection cable 20 via a mating connector 21. The cable 20 terminates in a plug 22 suitable for connection to known remote temperature measurement and control equipment (not shown), e.g. standard measuring equipment used with thermocouple devices. This equipment converts indications of the temperature to which the junction 11 is exposed to a form recognizable by humans (e.g. a numeric display) or machines (e.g. a digital output).

Figure 2:
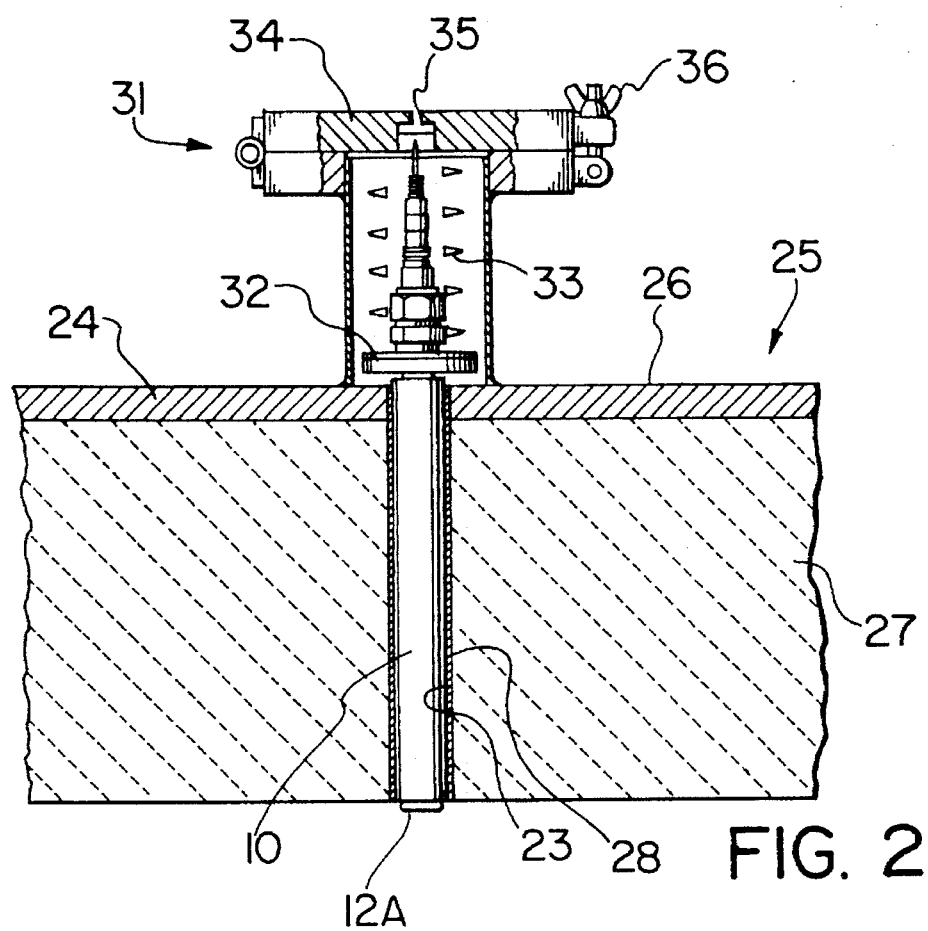
FIG. 2 is a cross-section of part of a wall of a rotary calcining kiln showing the thermocouple unit of FIG. 1 mounted therein.

FIG. 2 shows the thermocouple device 10 mounted in an opening 23 in a sidewall 24 of a rotary calcining kiln 25. The opening is provided with an alumina liner 28 to produce a smooth bore. The thermocouple device 10 extends from the outer surface 26 of the kiln wall to the kiln interior through a layer of refractory insulation 27. As shown more clearly in the enlarged view of FIG. 3, the extreme outer end 12A or tip of the protective element 12 projects slightly into the interior of the kiln by a distance Y, usually in the range of 5 mm to 1 cm, from the surrounding inner surface 30 of the insulation layer 27. This distance allows the protective element to penetrate into the charge of hot abrasive material (not shown), e.g. petroleum coke undergoing calcination, far enough to provide good temperature measurement, while minimizing the exposure of the protective element 12 to impact by large particles, abrasion and shocks.

At its opposite end, the thermocouple device is retained and protected by a sturdy holder incorporating a hinged cover arrangement 31 securely attached, e.g. by welding, to the kiln wall 24. The thermocouple device 10 is held in place by an enlarged collar 32 provided at the upper end of the aluminum tube 15, which abuts against the outer surface 26 of the kiln wall 24, and by a coil spring 33 extending between a hinged cover 34, forming part of the cover arrangement, and the collar 32. The coil spring allows the thermocouple unit to slide temporarily outwardly through the alumina tube 28 when the tip 12A is struck by a heavy particle of the charge in the kiln interior, thus offering further protection against damage.

The hinged cover arrangement 31 is provided with a hole 35 for the thermocouple cable 20 and a clamp 36 for fastening the cover in the closed position. This arrangement allows for rapid and easy replacement of the thermocouple unit 10 since all that the operator has to do is to open the cover 34, remove the coil spring 33, disconnect and withdraw the old thermocouple unit 10 and replace it with a new thermocouple unit, followed by repositioning of the coil spring and closing the cover. This ease of replacement is a considerable advantage because the thermocouple units of the invention, while being capable of resisting the harsh operating conditions for an adequate period of time as mentioned above, do need to be replaced from time to time and the illustrated mounting arrangement ensures that the kiln will be out of operation for the minimum period of time when such replacement is required.

Figure 4:
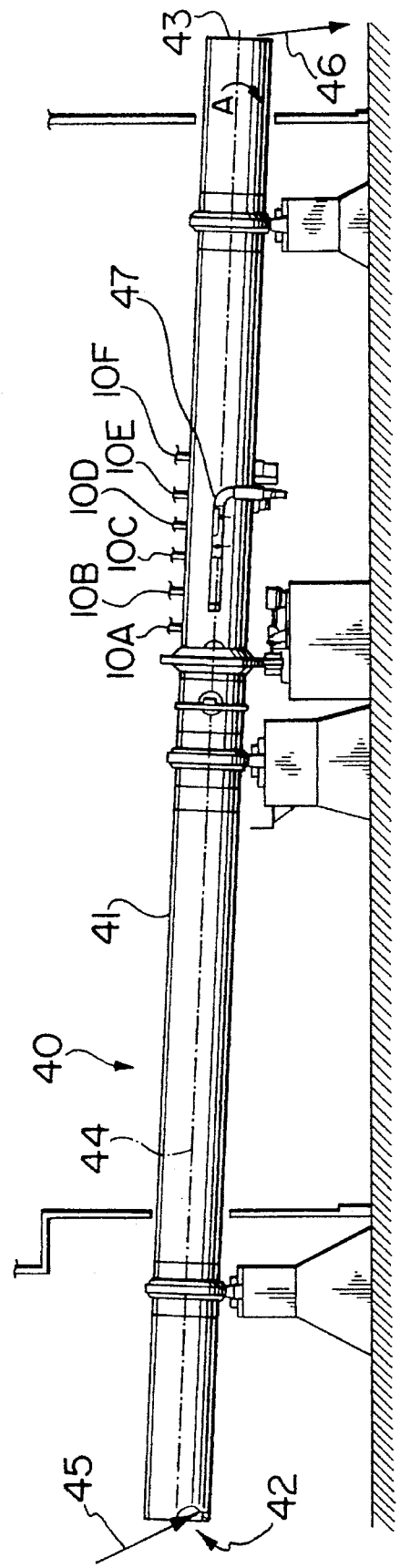
FIG. 4 is a complete side elevational view of a rotary calciner equipped with temperature measuring devices of the kind shown in FIGS. 1 to 3.

FIG. 4 shows a typical rotary calcining kiln 40 provided with several temperature measuring devices of the kind shown in FIGS. 1 to 3. The kiln comprises a refractory-lined hollow cylinder 41, often referred to as a "shell", arranged to slope downwardly from an upper feed inlet 42 to a lower discharge outlet 43. The rotary calcining kiln is preferably rotated slowly around its longitudinal axis 44 in the direction shown by arrow A. Green petroleum coke, represented by the arrow 45, is introduced into the upper inlet 42 and calcined coke, represented by arrow 46, emerges from the lower outlet 43. The rate of throughput of the coke is determined by such factors as the angle of slope of the rotary calcining kiln relative to the horizontal (although this is normally fixed), the rate of rotation of the kiln (which is capable of being varied, e.g. within a range of 1 to 3 r.p.m.) and the rate of feed of the green coke to the inlet 42.

A series of tuyeres 47 extends through the wall 41 in the region where the emission of volatiles from the coke is likely to be the highest, i.e. in the region of the calcination zone. These tuyeres 47 introduce air or oxygen into the kiln in order to enable the emitted volatile materials to burn within the kiln and thus to heat the incoming charge of green coke. The burning volatiles form a fireball (not shown) within the interior of the kiln.

It is desirable to control the kiln is such a way that the hottest zone of the coke charge (i.e. the calcination zone) is kept at or near the position of the tuyeres 47. In order to make this possible, a series of preferably six thermocouple devices according to the present invention 10A, 10B, 10C, 10D, 10E and 10F, are positioned through the wall of the kiln overlapping the region where the tuyeres enter the kiln so that the temperature profile of the coke may be measured in this region. Based on the information from the thermocouple units, and using control equipment similar to that disclosed for example in Canadian patent No. 1,052,313, the kiln can be controlled to maintain the calcination zone in the required position within the kiln.

To allow for the rotation of the thermocouple devices with the kiln shell, the devices may be connected to radio transmitters attached to cool parts of the shell exterior so that data from the devices can be sent to remote temperature measuring and recording equipment without the problems that would be caused by direct connection via electrical leads.

It should of course be realized that, while the temperature measuring devices of the invention are intended specifically for use in petroleum rotary calcining kilns of this type, they can of course be used for other industrial high temperature applications (e.g. those operating at temperatures above 1100° C.) which expose the devices to abrasion and shocks and thus present premature failure risks. Examples include alumina rotary calcining kilns, cement furnaces, red mud rotary calcining kilns, dross treatment plasma furnaces and anode baking furnaces. It should also be realized that temperature sensors other than thermocouple junctions may be employed in the temperature measurement devices of the invention.

The invention is illustrated further by reference to the following Example which is intended only for illustration and should not be viewed as limiting the scope of the invention.

EXAMPLE

A mixture of alumina (80% by volume) and silicon carbide (20% by volume) powders was hot-pressed at 1500° C. and 8000 psi for one hour under argon to produce a ceramic sheath. The alumina powder was a grade A16-SG from Alcoa. The silicon carbide was a 500 grits powder from the Norton Company.

The ceramic sheath was used to protect a thermocouple unit in a rotary coke calciner and the unit lasted for ten months of continuous use.

A similar thermocouple unit shielded by an element made of alumina alone failed after one month of use.

What we claim is:

1. A temperature measuring device for measuring the temperature of an abrasive particulate material, comprising:
   a temperature sensor producing an indication of a temperature to which the sensor is exposed;
   means for connecting said temperature sensor to remote equipment for determining said temperature from said indication; and
   a protective element shielding said temperature sensor from damage by said abrasive particulate material;
   said protective element comprising a layer of ceramic material having a matrix of alumina reinforced with 5 to 50% by volume of particles of silicon carbide selected from generally spherical particles and platelets in which thickness dimensions are less than length and width dimensions, said generally spherical particles having average diameters falling within the range of 5 to 60 microns and said platelets having average length and width dimensions each falling within the range of 5 to 60 microns.

2. A device according to claim 1 wherein said ceramic material comprises 10 to 30% by volume of particles of silicon carbide.

3. A device according to claim 1 wherein said particles of silicon carbide are in the form of said platelets.

4. A device according to claim 3 wherein said platelets have an average thickness in the range of 1–10 microns.

5. A device according to claim 3 wherein said platelets are single crystals.

6. A device according to claim 1 wherein said ceramic material is a product produced by cold pressing an homogenous mixture of alumina particles and silicon carbide particles to form an abrasion-resistant body.

7. A device according to claim 1 wherein said ceramic material is a product produced by uniaxial hot-pressing an homogenous mixture of particles of alumina and silicon carbide to form an abrasion-resistant body.

8. A device according to claim 6 or claim 7 wherein said particles of alumina are submicronic.

9. A device according to claim 1 wherein said protective element comprises a block of said ceramic material having a blind bore for receiving said temperature sensor therein.

10. A device according to claim 1 wherein said layer of ceramic material has a thickness in the range of 2 to 10 mm, at least in a region positioned directly between said temperature sensor and an outer surface of said layer intended in use to contact said abrasive particulate material.

11. A device according to claim 1 wherein said layer of ceramic material has a thickness in the range of 2 to 3 mm, at least in a region positioned directly between said temperature sensor and an outer surface of said layer intended in use to contact said abrasive particulate material.

12. A device according to claim 1 further comprising a housing for said sensor and said connecting means, wherein said housing comprises a heat-insulating tube surrounded by a metal tube, said metal tube being surrounded by a protective jacket made of ceramic fibers, and said metal tube and said jacket surrounding said protective element and being open at adjacent ends thereof, with said protective element projecting partially through said open ends.

13. A device according to claim 12 wherein said heat-insulating tube is packed with ceramic fibers adjacent said protective element and with a cement.

14. A furnace having a temperature measuring device, comprising:

an outer wall defining an interior space for containing a moving charge of abrasive particulate material at high temperature; means for heating the charge within the interior space; means for moving the charge through said interior space; at least one through opening in said outer wall; a temperature measuring device positioned in said at least one through opening, including a temperature sensor producing an indication of a temperature to which the sensor is exposed; means for connecting said temperature sensor to remote equipment for determining said temperature from said indication; and a protective element shielding said temperature sensor from damage by said abrasive particulate material; said protective element comprising a layer of ceramic material having a matrix of alumina reinforced with 5 to 50% by volume of particles of silicon carbide selected from generally spherical particles and platelets in which thickness dimensions are less than length and width dimensions, said said generally spherical particles having average diameters falling within the range of 5 to 60 microns and said platelets having average length and width dimensions each falling within the range of 5 to 60 microns.

15. A furnace according to claim 14 wherein said protective element projects from a inner surface of said outer wall into said interior space by a distance of 5 mm to 1 cm.

16. A furnace according to claim 14 further including a holder for holding said temperature measuring device in said at least one through opening, wherein said holder includes means for allowing said temperature measuring device to move temporarily through said at least one through opening in a direction away from said interior to a limited extent corresponding to a distance by which said protective element projects into said interior space, in response to forces exerted on said protective element by said charge, and for returning said temperature sensing device to an original position in said at least one through opening when said forces are no longer exerted.

17. A furnace according to claim 14 wherein said holder includes a removable cover positioned over an outer end of said temperature measuring device, and a spring element extending between an inner surface of said cover and said outer end of said temperature measuring device.

18. A protective element for protecting a temperature sensor of a temperature measuring device, comprising a block of ceramic material having a matrix of alumina reinforced with 5 to 50% by volume of particles of silicon carbide selected from generally spherical particles and platelets in which thickness dimensions are less than length and width dimensions, said generally spherical particles having average diameters falling within the range of 5 to 60 microns and said platelets having average length and width dimensions each falling within the range of 5 to 60 microns.

19. A protective element according to claim 18 wherein said ceramic material comprises 10 to 30% by volume of particles of silicon carbide.

20. A protective element according to claim 18 wherein said ceramic material is a product produced by cold pressing an homogenous mixture of alumina and silicon carbide particles to form an abrasion-resistant body.

21. A protective element according to claim 18 wherein said ceramic material is a product produced by uniaxial hot-pressing an homogenous mixture of particles of alumina and silicon carbide to form an abrasion-resistant body.

22. A protective element according to claim 18 wherein said silicon carbide particles are single crystal platelets.

23. A protective element according to claim 18 including a blind bore for receiving said temperature sensor therein.

24. A protective element according to claim 18 wherein said ceramic material has a thickness in the range of 2 to 10 mm, at least in a region positioned in use directly between said temperature sensor and an outer surface of said block intended to contact said abrasive particulate material.

25. A protective element according to claim 18 wherein said ceramic material has a thickness in the range of 2 to 3 mm, at least in a region positioned in use directly between said temperature sensing element and an outer surface of said layer intended to contact said abrasive particulate material.

* * * * *